Feb. 3, 1959
A. A. WINSLOW
2,872,555
TEMPERATURE RESPONSIVE CONTROL DEVICE
Filed Oct. 15, 1956
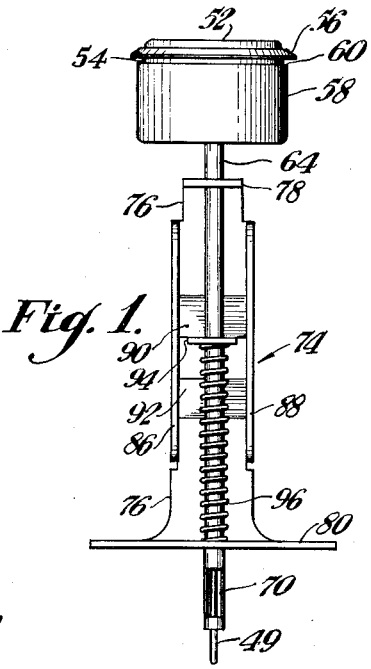
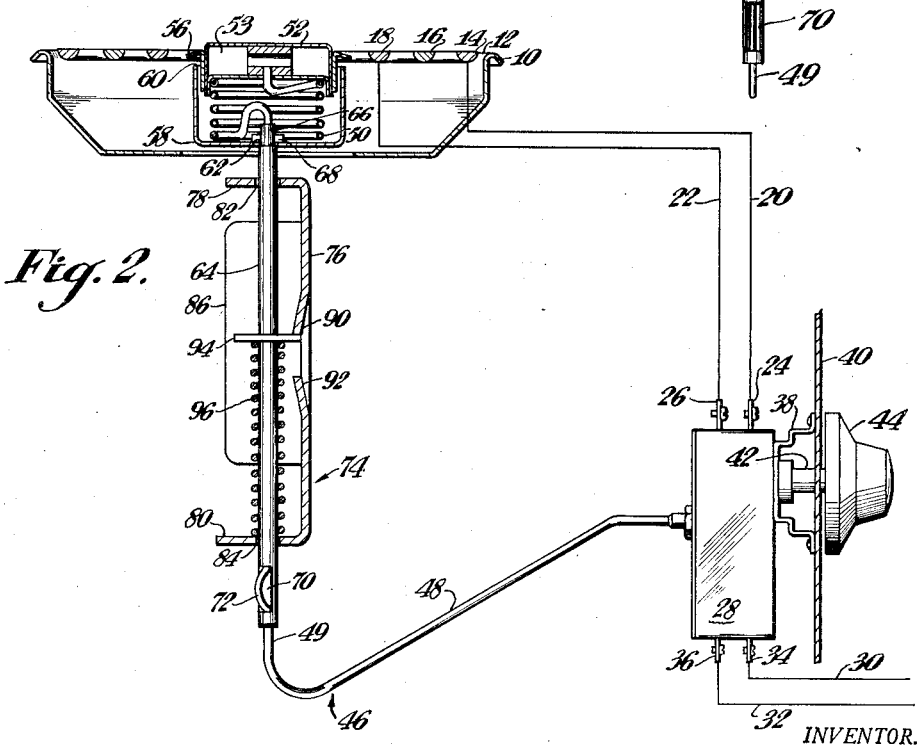
INVENTOR.
*Arnold A. Winslow.*
BY
*HIS ATTORNEY.*

2,872,555

TEMPERATURE RESPONSIVE CONTROL DEVICE

Arnold A. Winslow, Greensburg, Pa., assignor to Robertshaw-Fulton Controls Company, Greensburg, Pa., a corporation of Delaware Application October 15, 1956, Serial No. 616,064

7 Claims. (Cl. 219—20)

This invention relates to thermostatic controls, and more particularly to a temperature responsive control element adapted to be located in close proximity to a heating unit.

In the control of surface heating units of cooking ranges, a central opening in the burner has been provided through which a temperature sensing bulb projects into surface contact with the bottom of the heated body. A capillary tube connects the sensing bulb to a thermostatic switch so that the energizing circuit for the burner is opened and closed at such times as to maintain the temperature of the heated body at a predetermined value.

It is an object of this invention to utilize an improved shield for the temperature sensing element of a heating appliance so that excessive ambient temperatures will not affect the thermostatic control of the appliance.

Another object of this invention is to support the temperature sensing bulb of a heating unit in a resilient manner so that the temperature sensing bulb is maintained in surface contact with the heated body.

A further object of the invention is to support the temperature sensing bulb of a surface heating unit on a movable member whose movement is limited by stops on a stationary bracket engaging the movable member.

Other objects and advantages of this invention will become apparent from the following description when considered in connection with the accompanying drawings wherein:

Fig. 1 is an elevation view showing the temperature sensing bulb and its support therefor; and Fig. 2 is a schematic view showing in elevation the control panel of an electric range and a surface burner therefor with certain parts being illustrated in section.

While the invention is shown and described in connection with the top surface unit of an electric range, it should be understood that it is equally applicable to the construction of a gas range and other heating appliances.

Referring to Fig. 1, there is shown top plate 10 of an electric range having an aperture 12 for the reception of annular heating elements 14, 16, and 18 of a surface heater. The heating elements are supported in any suitable manner with their exposed surfaces being in flush relation with the top surface of the top plate 10. The heating elements 14, 16, and 18 are interconnected electrically and are connected by wires 20 and 22 to terminals 24 and 26, respectively, of thermostatically operated electric switch 32 which receives current from a supply source (not shown) by means of wires 30 and 32 connected to terminals 34 and 36, respectively. Switch 28 is attached by a bracket 38 to the inner face of front panel 40 and is provided with an operating shaft 42 projecting through the panel 40 and carrying a control knob 44 on the end thereof.

A capillary tube 46 has a connecting portion 48 which is connected to switch 28, a coiled portion 50 which is connected to temperature sensing bulb 52, and a straight portion 49 disposed between and connected to the portions 48 and 50. A chamber 53 in the bulb 52 houses a suitable thermal fluid (not shown) which will expand or contract in response to temperature variations sensed by the bulb 52.

Annular collar 54 is rigidly attached to bulb 52 by any suitable means. The upper portion of collar 54 is everted to form a flange 56 just below the top surface of bulb 52. A cup-shaped shield 58 is provided with a lip 60 at its upper periphery and with an aperture 62 in the center of its base. The collar 54 does not engage the walls of the shield 58 but is in a telescoping relation therewith so that the bulb 52 and collar 54 are free to pivot inside the shield 58.

The coiled portion 50 of the capillary tube 46 is housed within the cup-shaped shield while the straight portion 49 of the capillary tube 46 extends through hollow stem 64. A reduced end portion 66 of hollow stem 64 extends through aperture 62 in the shield 58 and is rigidly secured thereto by a collar 68. An elongated slot 70 in hollow stem 64 is located adjacent the lower end thereof and straight portion 49 of the capillary tube is locked to the hollow stem 64 by bending a segment of the tube to form a crimped end 72.

Bracket 74 is rigidly attached to the electric range by any suitable means in a position beneath the shield 58. Rear section 76 of bracket 74 has an upper flange 78 and a lower flange 80 extending perpendicularly from its ends. An aperture 82 in upper flange 78 is in alignment with an aperture 84 in the lower flange 80. Rear section 76 is reinforced by lateral sections 86 and 88 extending perpendicularly from each side of rear section 76. An upper segment of the rear section 76 is bent inwardly to form an up-stop projection 90, while a lower segment is bent inwardly to form a down-stop projection 92 in opposed relation to projection 90.

The hollow stem 64 extends through aligned apertures 82 and 84 and has an annular collar 94 rigidly secured thereto at a point intermediate the ends thereof. Coil spring 96 is disposed around hollow stem 64 and biased between collar 94 and the lower flange 80.

In the operation of the device, a cooking vessel placed upon the annular heating elements 14, 16, and 18 will first engage the temperature sensing bulb 52 to move the bulb 52 downward against the bias of the coiled portion 50 of the capillary tube 46. With the control knob 44 rotated to a setting indicative of a desired temperature, current flows from the power lines 30 and 32 through the switch 28 to energize the heating element 14, 16, and 18 by way of wires 20 and 22. The cooking vessel (not shown) receives heat from the heating elements in the usual manner and in turn, heats the temperature sensing bulb 52 which is in surface contact therewith. Heat is conducted through the bulb 52 causing expansion of the thermal fluid in the chamber 53. Variation in the condition of the thermal fluid in the chamber 53 is transmitted by way of the capillary tube 46 to the thermostatic switch 28 to control the operation of the switch and thus control the temperature at which the food in the cooking vessel will be cooked.

Although the temperature sensing bulb is positioned in close proximity to the heating elements 14, 16, and 18, it is shielded from the heat thereof by the annular collar 54 and the shield 58. Flange 56 acts as a drip shield to prevent any gumming of the mechanism in the cup-shaped shield 58 due to accidental spillage.

As is shown in Fig. 2, the shield 58, the straight portion 49 of the capillary tube 48, the hollow rod 64 and the collar 94 are integrated to reciprocate as a unit. With a force exerted on the top of the sensing bulb 52, the attached collar 54 and flange 56 are moved downward against the bias of the coiled portion 50 and against the bias of the coil spring 96. The extent of this downward movement is limited by the down-stop 92 which will engage the collar 94 on the hollow stem 64.

The coiled portion 50 of the capillary tube 46 exerts a biasing force on the sensing bulb 52 which is free to pivot inside the shield 58 so that the sensing bulb is aligned in surface contact with the bottom of the cooking vessel. The proximity of the coiled portion 50 to the bulb 52 and the resiliency of the coiled portion 50 insures easy alignment. After a small amount of compression the coiled portion 50 stiffens sufficiently so that any further movement compresses the coil spring 96. The coil spring 96, acting through the stem 64, exerts a biasing force on the sensing bulb 52 to maintain the bulb in alignment with the bottom of the cooking vessel. This upward movement is limited by the engagement of collar 94 with the up-stop 90. In order to prevent misalignment of the sensing bulb 52 with the cooking vessel, the longitudinal axes of the coiled portion 50 and the coil spring 96 are coincident, and the reciprocating motion of the hollow stem 64 cannot transmit any horizontal force components to the sensing bulb 52 because the hollow stem 64 reciprocates in aligned apertures 82 and 84 to guide the hollow stem along a vertical axis.

Inasmuch as this invention is subject to many variations and modifications, it is intended that all matter contained in the above description shall be interpreted as illustrative and not in a limiting sense.

What is claimed is:

1. A control device for a heating appliance having a heater for heating a container, said device comprising a thermal sensing element adapted to be positioned adjacent the heater to contact the container, a capillary tube connected to said sensing element and having a coiled portion and a straight portion, a shield for said sensing element, a hollow rod secured to said shield for movement therewith, said coiled and straight portions of said tube being disposed in said shield and said rod respectively, locking means on said straight portion engaging said hollow rod to prevent relative movement between said straight portion and said hollow rod, a relatively stationary member having guide means to receive said hollow rod and direct its movement, a collar secured to said hollow rod, and yieldable means on said hollow rod engaging said collar and said stationary member to bias said hollow rod upwardly whereby said shield and said sensing element are adapted to be retained in surface alignment to contact the container.

2. The control device recited in claim 1 wherein stop means are provided on said stationary member to cooperate with said collar in limiting the movement of said hollow rod.

3. A control device for a heating unit adapted to heat a cooking vessel, said device being operative to regulate the temperature of the vessel and comprising a thermostatic switch adapted for controlling energy supplied to the unit, a sensing element adapted to be positioned adjacent the unit, a capillary tube connecting said sensing element to said switch, a shield for said sensing element, said capillary tube having a coiled portion within said shield to bias said sensing element relative to said shield whereby said sensing element is positioned in proper alignment with the vessel, and resilient support means for said shield to bias said shield and said sensing element relative to the heating unit whereby said sensing element is maintained in its proper alignment with the vessel, said support means comprising a hollow stem secured to said shield, a straight portion of said capillary tube being disposed in said hollow stem and having a crimped end whereby said straight portion and said stem are integrated, a relatively stationary bracket having a rear elongated section and short top and bottom end sections perpendicularly disposed to said rear section, aligned apertures in said end sections receiving said hollow stem for movement therethrough, a collar secured to said stem between said end sections, a coil spring disposed about said stem between said collar and the bottom end section of said bracket and a pair of oppositely disposed stops formed on said rear section to engage said collar and limit upward and downward movement of said stem and the connected shield.

4. In a control device for a heater adapted to heat a container, a temperature responsive control device for regulating the temperature of the container comprising a thermostatic switch adapted for controlling the energy supplied to the heater, a temperature sensing bulb adapted to contact the container and having a shield abutting flange thereon, a capillary tube connecting said bulb to said switch and having a coiled portion and a straight portion, a cup-shaped shield for said bulb and having said coiled portion disposed therein whereby said bulb is positioned in surface contact with the container, a hollow stem having an upper end fastened to said shield for movement therewith, said straight portion of said tube being disposed in said hollow stem and having a crimped bend engaging said hollow stem so that said straight portion and said hollow stem move as a unit, a relatively stationary bracket having a rear section with upper and lower flanges extending perpendicularly therefrom, aligned apertures in said flanges receiving and guiding said hollow stem therethrough, a collar rigidly attached to said hollow stem at a point between the upper and lower flanges of said bracket, and a coil spring surrounding said hollow stem and disposed between said collar and said lower flange and adapted to maintain said bulb in surface contact with the container.

5. The control device recited in claim 4 wherein stop means are formed on said bracket to cooperate with said collar in limiting the movement of said hollow stem.

6. The control device recited in claim 4 wherein up and down stops project from the rear section of said bracket to engage said collar and limit the biasing force exerted by said coil spring.

7. A control device for a heating appliance having heating means adapted to heat a container, said device comprising a thermal sensing element adapted to be positioned adjacent the heating means and having an upper surface adapted to contact the container, a hollow member surrounding said element and being attached thereto to form a collar for shielding said element from ambient temperatures, a flange extending radially from the upper end of said hollow member and being disposed in a plane beneath the upper surface of said element, a cup-shaped member having an upper portion telescoping said hollow member, a movable member attached to said cup-shaped member for movement therewith, a relatively immovable member receiving said movable member and having guide means for guiding said movable member, and resilient means on said movable member cooperating with said immovable member to bias said movable member.

References Cited in the file of this patent

UNITED STATES PATENTS

| 2,288,510 | Brannon | June 30, 1942 |
| 2,303,012 | Weber et al. | Nov. 24, 1942 |
| 2,487,946 | Senn | Nov. 15, 1949 |
| 2,678,379 | Fry | May 11, 1954 |
| 2,699,487 | Turner | Jan. 11, 1955 |
| 2,715,176 | Schoberle | Aug. 9, 1955 |
| 2,786,930 | Weber et al. | Mar. 26, 1957 |
| 2,813,963 | Lennox | Nov. 19, 1957 |
| 2,820,129 | Long et al. | Jan. 14, 1958 |